United States Patent
Vance (10) Patent No.: US 12,025,495 B2
(45) Date of Patent: Jul. 2, 2024

(54) OPTICAL PUMPING ENHANCEMENT OF A TWO-PHOTON SPECTROMETER AND A TWO-PHOTON FREQUENCY STANDARD

(71) Applicant: Joseph Daniel Vance, Sonora, CA (US)

(72) Inventor: Joseph Daniel Vance, Sonora, CA (US)

(*) Notice: Subject to any disclaimer, the term of this patent is extended or adjusted under 35 U.S.C. 154(b) by 0 days.

(21) Appl. No.: 17/750,264

(22) Filed: May 20, 2022

(65) Prior Publication Data
US 2022/0404198 A1 Dec. 22, 2022

Related U.S. Application Data

(60) Provisional application No. 63/193,034, filed on May 25, 2021.

(51) Int. Cl.
  *G01J 3/10* (2006.01)
  *G01J 3/447* (2006.01)

(52) U.S. Cl.
  CPC ............... *G01J 3/10* (2013.01); *G01J 3/447* (2013.01)

(58) Field of Classification Search
  CPC .. G01J 3/10; G01J 3/447; G01S 17/50; G01S 7/499; G02F 1/3526
  See application file for complete search history.

(56) References Cited

U.S. PATENT DOCUMENTS

| | | | |
|---|---|---|---|
| 4,040,718 A | 8/1977 | Bjorklund | |
| 5,513,032 A | 4/1996 | Billmers | |
| 5,721,632 A | 2/1998 | Billmers | |
| 7,876,445 B1 | 1/2011 | Vance | |
| 7,884,944 B2 | 2/2011 | Vance | |
| 2009/0207470 A1* | 8/2009 | Vance | .............. G02F 1/3526 359/241 |

(Continued)

OTHER PUBLICATIONS

Renju S. Mathew, Francisco Ponciano-Ojeda, James Keaveney, Daniel J. Whiting, and Ifan G. Hughes, "Simultaneous two-photon resonant optical laser locking (STROLLing) in the hyperfine Paschen-Back regime," Opt. Lett. 43, 4204-4207 (2018) (Year: 2018).*

(Continued)

*Primary Examiner* — Tarifur R Chowdhury
*Assistant Examiner* — Akbar H. Rizvi (57) ABSTRACT

A light frequency standard for use as an optical clock is disclosed that is improved by optical pumping. Optical pumping is utilized to change the ground states of the atomic vapor from transition-forbidden to transition-allowed ground states involved in two-photon absorption process. Using an optical pump creates a stronger absorption line signal used for locking the laser to an absolute frequency. An optical spectrometer based upon two-photon absorption is disclosed that is improved by optical pumping, utilizing two optical pumps. The first optical pump provides photons that may combine with probe light for two-photon absorption, but it also depletes absorbing atoms that are in ground states. The second optical pump replenishes the supply of absorbing atoms into ground states allowing two-photon absorption between the first optical pump and the probe light. Two-photon absorption between the second pump light and the probe light is forbidden due to energy mismatch.

4 Claims, 6 Drawing Sheets

(56) References Cited

U.S. PATENT DOCUMENTS

2015/0124319 A1* 5/2015 Vance .................. G02B 27/288
                                                    359/484.09
2016/0123807 A1* 5/2016 Vance .................. G02B 27/288
                                                    359/489.08

OTHER PUBLICATIONS

U.S. Appl. No. 14/531,965, filed Nov. 3, 2014, Vance.
Becerra, Two-photon dichroic atomic vapor laser lock using electromagnetically induced transparency and absorption, Jul. 2009, vol. 26, No. 7, J. Opt. Soc. Am. B.
Baluschev, Tunable and frequency-stablized diode laser with Doppler-free two-photon Zeeman lock, Sep. 20, 2000, vol. 39 No. 27, Applied Optics.
Martin, Compact optical atomic clock on a two-phton transition in Rubidium, Jan. 18, 2018, Physical Review Applied 9.
Vance, Two-photon absorption dispersion spectrometer for 1.53 um eye-safe Doppler LIDAR, Jul. 1, 2012, vol. 37 No. 13, Optics Letters.

* cited by examiner

OPTICAL PUMPING ENHANCEMENT OF A TWO-PHOTON SPECTROMETER AND A TWO-PHOTON FREQUENCY STANDARD

FIELD OF THE INVENTION

This invention is applicable to the field of absolute frequency standards, optical clocks and spectroscopy. Among the uses of the absolute frequency standard is implementation into an optical clock. A two-photon absorption spectrometer for measuring Doppler shift with LIDAR is another application.

BACKGROUND OF THE INVENTION

Two-photon absorption is a process that depends upon the number of absorbers available for absorption and upon the intensity of light. What is disclosed here is an apparatus and method to increase the number available absorbers for possible two-photon absorption, enhancing the two-photon absorption process. Two applications of this invention are included in the disclosure.

In one application two-photon absorption has been investigated for use in optical frequency standards because Doppler broadening of the line may be reduced or eliminated with opposing beams. Presented here is an improved frequency standard for use in an optical clock. A second application is a two-photon absorption spectrometer. Presented here is an apparatus and method that utilizes two-photon dispersion to measure frequency. Applications include the measurement of Doppler shift with LIDAR.

DETAILED DESCRIPTION OF THE INVENTION

Several drawings and associated written description illustrate the physical attributes and quantities that may be manifested with the construction of two-photon absorption enhancement and utilization as a frequency standard, and utilization in an optical spectrometer in accordance with embodiments of the present invention. Examples are described that have particular absorbing substances, mediums, transitions, wavelengths of light pairs, etc. for purposes of illustration. However, it should be noted that the choices of particular absorbing substance and particular transitions are abundant. Also, while concomitant to the chosen transitions, the wavelengths of the frequency standard light have wide latitude of choice upon a continuum. Thus it is recognized that the apparatus and means described herein may vary without departing from the basic underlying concepts of the invention.

The current invention includes a method and apparatus of producing frequency standard light. One use of the frequency standard light is for it to be a component of an optical clock. The goal is to maintain the frequency standard light to an absolute frequency line with as little deviation from the absolute frequency line as possible. Absorption line dispersion is the physical quantity that identifies displacement from line center. Measurement of polarization rotation identifies the dispersion so that feedback can be applied to the light source to maintain it to the absolute frequency line. The current invention also includes a method and apparatus to measure frequency. The spectrometer may be useful in LIDAR for measuring Doppler shift and range. The spectrometer may also be useful as an information decoder for information that is embedded in frequency.

Two-Photon Absorption

Two-photon absorption lines are utilized in the current invention. Consider an atomic transition from a ground state (lowest allowed energy state of an atom) to an intermediate excited state, which can occur with the absorption of a single photon. Furthermore, consider another transition from the intermediate excited state to another still higher energy state, a final excited state that can occur with the absorption of a single photon. Two-photon-absorption is the direct transition from the ground state to the final excited state, avoiding the intermediate state, by the simultaneous absorption of two photons. A two-photon-transition identifies the states of the substance involved in two-photon-absorption. A two-photon-absorption line is a frequency bandwidth of light that can be absorbed by the process of two-photon-absorption, and is associated with a two-photon transition.

In the case of two-photon absorption, the only restriction upon the energy of the photons is that the sum of their energies match the total energy of the atomic transition:

$$E_{excited} - E_{ground} = \frac{hc}{\lambda_1} + \frac{hc}{\lambda_2} \qquad \text{equation 1}$$

Equation (1) demonstrates that there is some freedom of choice of wavelengths $\lambda_1$ & $\lambda_2$. Conservation of energy requires only that the sum of the two photon energies match the two-photon transition, which is a considerably relaxed condition compared to a sequential transition, where each photon energy individually matches the transition energy. Energy resonance of light with a single photon absorption line is not required nor excluded in the two-photon-absorption process. But, the two-photon cross section is reduced rapidly as the photons move away from single photon resonance, thus it is advantageous to have the frequency (energy) of the photons coincide as much as possible with the energy of the single photon transitions. Practical two-photon absorption involves the rigid application of angular momentum selection rules. Because conservation of angular momentum is never violated, selection rules place restrictions upon the interaction of light with matter. In units of h/2π, all photons have angular momentum. Since angular momentum is a vector, it has magnitude and direction. A photon with right-handed circular polarization has an angular momentum direction opposite to the propagation direction, and a magnitude of one. A photon with left-handed circular polarization has an angular momentum direction in the same direction as the propagation direction, and a magnitude of one. For atomic dipole transitions, or allowed transitions, there is a change in magnitude of angular momentum between the initial state and final state of one, with the emission or absorption of a single photon. Consider a sequence of two dipole transitions of an atom. Beginning with lowest energy state of the atom, the ground state, a transition can occur to an excited state, denoted here as an intermediate excited state, with absorption of a photon. Then another transition can occur from the intermediate excited state to a final excited state with absorption of another photon. By vector addition, angular momentum of the ground state and the final excited state have may differ by zero or two (e.g., 1−1=0; 1+1=2). Now consider the same situation except that instead of sequential absorption of two photons there is simultaneous absorption of two photons, denoted two-photon absorption. If the angular momentum of the electron that changes state is identical, then two-photon absorption can occur only with a photon pair that have angular momentum vectors aligned in opposite directions. Similarly, if the angular momentum of the electron of atom's ground state and the final excited state differ by two, then two-photon absorption can occur only with a photon pair that have angular momentum that is aligned in the same direction. Extrapolating from single photons to beams, (nearly) all the photons of a circularly polarized beam of light have their angular momentum vectors aligned in the same direction. Now consider the two-photon transition of rubidium from the 5s ground state to the 5d excited state. The angular momentum change of the transition in this particular case is 2. That means that the angular momentum vector of both photons involved in the two-photon transition must be aligned. Next, consider counter propagating beams travelling through rubidium atoms. For two-photon absorption to be allowed with one photon for each beam, both photons must have their angular momentum aligned in the same direction. Now consider a situation where the two-photon pump beam is circularly polarized and the probe beam is linearly polarized. The linearly polarized probe beam can be expressed as the sum of left circularly polarized light and right circularly polarized light in equal proportions. In this case, the angular momentum selection rule is satisfied for a photon from the two-photon pump beam and a photon from only one of the circularly polarized components of the probe beam. If the sum of the energy of the two photons adds up to the energy of the two-photon transition, and all the quantum mechanical selection rules allow the transaction, two-photon absorption can occur. Single photon absorption here means an allowed transition from a lower energy state to a higher energy state with the absorption of a single photon. With counter propagating beams, absorption is enhanced because when changing from the lab's reference frame to the atom's reference frame which is in motion, one photon is shifted upwards in frequency and one photon is shifted down in frequency and there is reduced or zero net Doppler shift.

Dispersion accompanies absorption. So with dispersion present for one circular component of the linearly polarized probe beam, and dispersion absent for one circular component of the linearly polarized probe beam, the medium becomes birefringent. Light dispersion and absorption can be expressed in terms of the susceptibility. The electric susceptibility is used to describe both the absorption and dispersion effects. The real portion of the electric susceptibility affects light phase while the imaginary portion of the susceptibility quantifies absorption. Whenever the real portion electric susceptibility is different for each circular polarization states of linear polarized light, then the medium becomes circularly birefringent. Linear polarized light will undergo polarization rotation to another linear polarized state while traveling through a circular birefringent medium. To quantify the birefringence, the electric susceptibility can be used and is defined here in terms of dielectric polarization density:

$$\vec{P} = \varepsilon_o \chi \vec{E} \qquad \text{Equation 2}$$

where the electric susceptibility $\chi$ is the proportionality constant linking the electric field of the probe light to the dielectric polarization, and co is the permittivity of free space. The electric susceptibility $\chi$ is dimensionless and also a complex quantity, and is expressed in component form as:

$$\chi = \chi' - i \chi'' \qquad \text{Equation 3}$$

Using a circular polarization basis to express linear light, with some minor approximations and removing time dependence, the electric field of light after traveling a distance l within a circularly birefringent medium is:

$$\vec{E}(l) = -\frac{E_o}{\sqrt{2}} \exp\left[i\left\{\frac{\omega}{c}\left(1 + \frac{\chi'_+}{2} + i\frac{\chi''_+}{2}\right)l\right\}\right] \hat{+} \qquad \text{Equation 4}$$

$$+ \frac{E_o}{\sqrt{2}} \exp\left[i\left\{\frac{\omega}{c}\left(1 + \frac{\chi'_-}{2} + i\frac{\chi''_-}{2}\right)l\right\}\right] \hat{-}$$

where ω is the angular frequency and c is the speed of light. Equation (4) demonstrates that $\chi'$, the real portion of the electric susceptibility, affects phase, while $\chi''$, the imaginary portion of the electric susceptibility, is related to absorption. The subscripts, plus and minus, attached to the susceptibilities identifies to which circular polarization state the electric susceptibility applies to: right and left handed polarization, respectively. Notice that the field vector is written in a circular polarization basis.

Figure 1A:
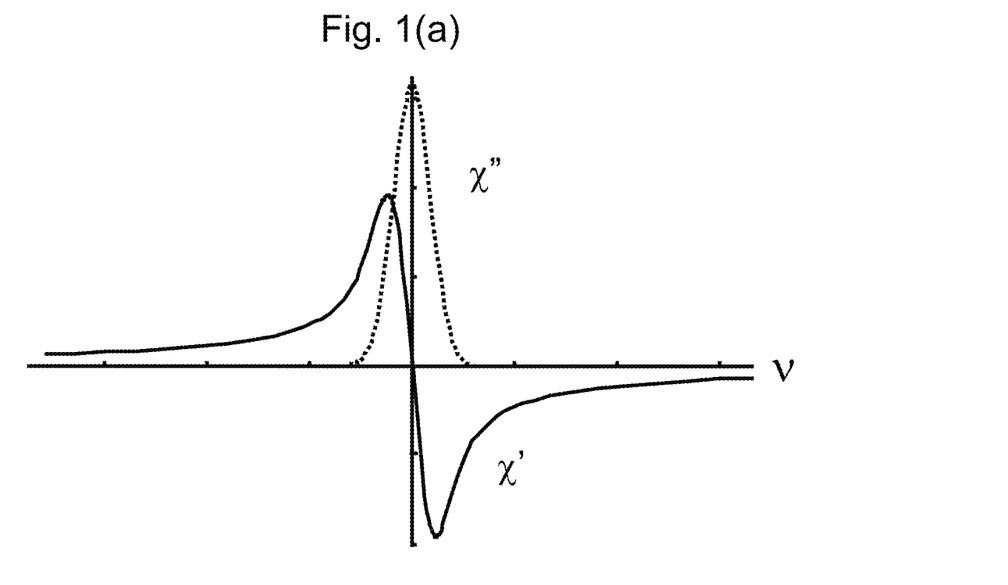
FIG. 1(a) shows a theoretical example the real ($\chi'$) and imaginary ($\chi''$) portions of the electric susceptibility near an absorption line.

The susceptibility is an analytic function. This has implications to the relationship of the real and imaginary portions of the susceptibility. The real and imaginary portions of the susceptibility are inexorably linked. In fact, if one is known then the other can be derived from it. Thus dispersion and absorption cannot be manipulated independently of each other. FIG. 1(a) is an example of the real and imaginary susceptibility from an absorption line. The region where the real portion of susceptibility changes most rapidly with frequency is also the region where absorption occurs. Here, dispersion induced by two-photon absorption is utilized in the optical spectrometer. In the frequency standard, dispersion is not utilized.

Optical Pumping

Now consider optical pumping. In embodiments of the optical spectrometer and also in embodiments of the frequency standard, optical pumping is utilized to enhance two-photon absorption. Here, pump light is circularly polarized. Also, to distinguish the purpose of the pump light, each will be designated differently as two-photon pump light, and ground state transitioning pump light. With the absorption of a circularly polarized photon from a ground state to an excited state, the magnetic quantum number increases or decreases by 1 depending upon the polarization state:

For right polarized light: $M_{excited} - M_{ground} = M_{absorption} = +1$

But upon emission the photon is allowed to be of different polarization, and magnetic quantum number change can be:

$M_{ground} - M_{excited} = M_{emission} = +1$ or 0 or $-1$

Figure 1B:
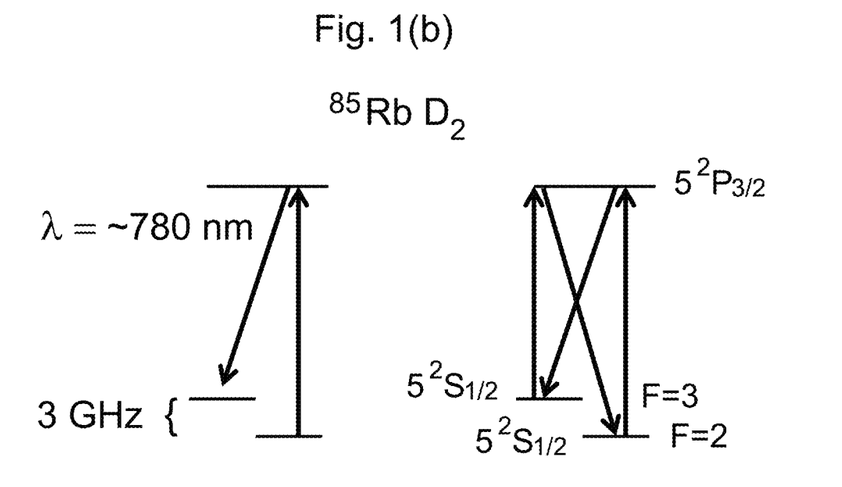
FIG. 1(b) The left figure shows how optical pumping depletes the number of atoms in the lower ground state. The right figure shows that with an additional optical pumping source, the lower state can be repopulated.

Similarly for left polarized light:

$M_{excited} - M_{ground} = M_{absorption} = -1$ and upon emission: $M_{ground} - M_{excited} = M_{emission} = +1$ or 0 or $-1$ Since atoms are continually absorbing light and then subsequently emitting light, pumping with right circularly polarized light increases the magnetic quantum number of the ground states and left circularly polarized light decreases the magnetic quantum number of the ground states. In rubidium the ground states are separated in energy. The ground states of rubidium 85 are separated in energy of 3.03 GHz. The lower ground state has a total atomic angular momentum quantum number of F=2 while the upper ground state energy state has a total angular momentum quantum number of F=3. In the following figures, FIG. 1(b) through FIG. 4, showing quantum states and transitions, the transition energy is not shown to scale so that the structure is easily conveyed. FIG. 1(b) shows the net effect of how applying circular polarized two-photon pump light can deplete the number of atoms in the lower energy state (left). To counteract this effect optical pump light in resonance with the upper state, and oppositely circularly polarized relative to the two-photon pump light is propagated through the rubidium atoms, to increase the number of atoms in the lower state (right). This enhancement is appropriate for some instances of two-photon absorption, and inappropriate for others.

Applying circular polarized optical pump light in resonance with the upper ground state will increase the number of atoms in the ground lower state so that there is an increase in atoms available for two-photon absorption that utilize the lower ground state.

Figure 2:
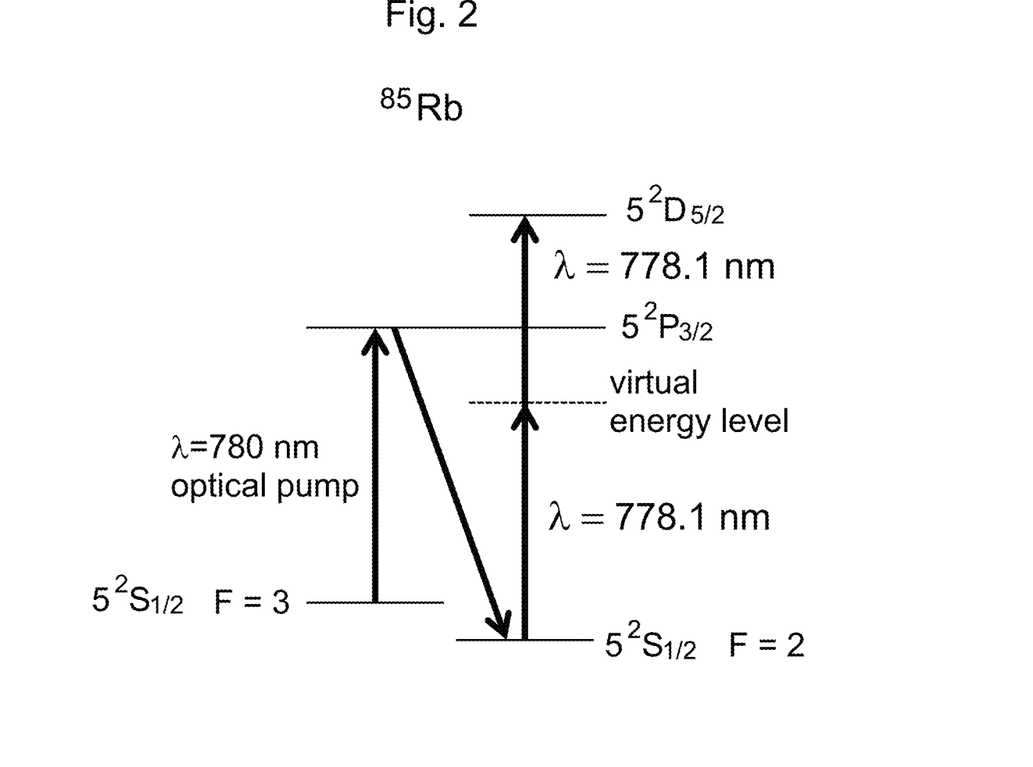
FIG. 2 illustrates the transitions and light wavelengths involved in the enhanced two-photon absorption where two-photon absorption occurs without resonance with intermediate excited state.
Figure 3:
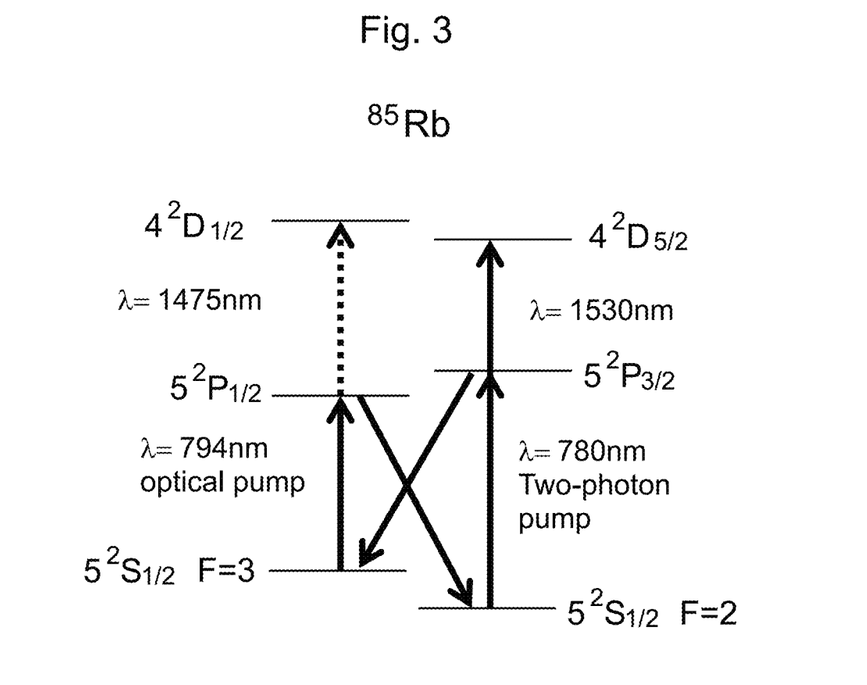
FIG. 3 illustrates two-photon transitions and optical pumping where two-photon absorption is in resonance with the intermediate excited state.

When the two-photon pump is not in resonance with an atomic transition, the above described enhancement is workable. FIG. 2 shows an example of two-photon absorption transition where the two-photon pump light is half the energy of the entire transition. The ground state is excited to a virtual intermediate excited state with a photon of wavelength 778.1 nm. From the virtual intermediate excited state another 778.1 nm photon can be absorbed with the atom transitioning from the $5S_{1/2}$ state to the $4D_{5/2}$ state. Since the two-photon pump light is not in resonance with any transition, after an atom is excited to a virtual state, it returns to the ground state from which it came, or another photon is absorbed and it transitions to the final excited state. From the final excited state it may decay into many ground states. Depletion of the number of atoms in lower ground states from optical pumping is negligible. When the two-photon pump light is in resonance with a transition, it introduces a complexity. When optical pump light and two-photon pump light excite atoms to the same state (same state meaning the principle quantum number and orbital angular momentum quantum number are the same) then there will be induced lines from each pump source in close or coincident frequency. When combined with the two-photon selection rules, there will be no induced birefringence. To avoid this situation the two-photon pump light and the optical pumping light can be in resonance with different absorption lines. FIG. 3 shows an induced two-photon line for one circularly polarized component of excited state transition light. In this example, circularly polarized 780 nm two-photon pump light is in resonance with the $5^2S_{1/2} \rightarrow 4^2D_{3/2}$ transition in rubidium. This induces an absorption line for one circular component of linear polarized light at a wavelength of 1530 nm with the transition of the rubidium atom from the $5^2P_{3/2} \rightarrow 4^2D_{5/2}$ state. Two-photon absorption is path dependent. There is no allowed transition from the $5P_{1/2}$ state to another state where the photon wavelength involved in the transition is near 1530 nm. Instead, another induced line shown in the dotted line of FIG. 3 shows the induced line for 1475 nm light. Since the lines are very far awary in frequency from each other, they have no dispersion influence on each other. Here, two absorption lines are far in frequency from each other when there exists a frequency between the lines where absorption is not large enough to be measureable. The induced line at 1475 nm can be ignored as it is far in frequency from the 1530 nm line, and the goal was to enhance the induced 1530 nm line with optical pumping. Other induces lines exist for rubidium, but each line is at frequencies far away from each other.

Zeeman Effect

The Zeeman Effect can be utilized to lock onto resonance. When a longitudinal magnetic field (magnetic field being collinear or opposite to light propagation direction) is applied to a paramagnetic absorbing substance, the absorption lines are split with one line shifted up and one line shifted down in frequency, with one line capable of absorbing left circularly polarized light and the other line capable of accepting right circularly polarized light. Here, since both two-photon pump light and optical pump light are both circularly polarized, a modulated magnetic field modulates a single absorption line instead of two split lines. For the induced absorption line, because of the quantum mechanical selection rules, a Zeeman modulated line is manifest for only one circular component in the case of linear polarized light.

Applying the above concepts we can begin to explain one embodiment of the current invention. The major elements of a two-photon absorption frequency standard with optical pumping enhancement are illustrated in schematic form in FIG. 4. In the figure, light beams are shown to be separated. This is to show the light paths. In actuality all the light paths are to be collinear within the vapor cell 105. A two-photon absorption light source 100 may be used to produce two-photon absorption light 101. An example of two-photon absorption light source 100 is a tunable DBR laser having a wavelength of approximately 778.1 nm. Another example of a two-photon absorption light source 100 is a 1556.2 nm DFB laser that is converted by second harmonic generation to approximately 778.1 nm. Two-photon absorption light 101 may be single frequency or a multiplicity of frequencies such as a frequency comb. The two-photon absorption light 101 may be tuned to resonance with a two-photon transition such as the 5S to 5P to 5D transition of atomic rubidium near 778.1 nm. The two-photon absorption light 101 may be incident upon and reflected off a beam splitter 102. The beam splitter 102 may be a dichroic or may be partially a reflecting mirror. Next, the two-photon absorption light 101 may be transmitted through a polarizing beam splitter 109.

Figure 4:
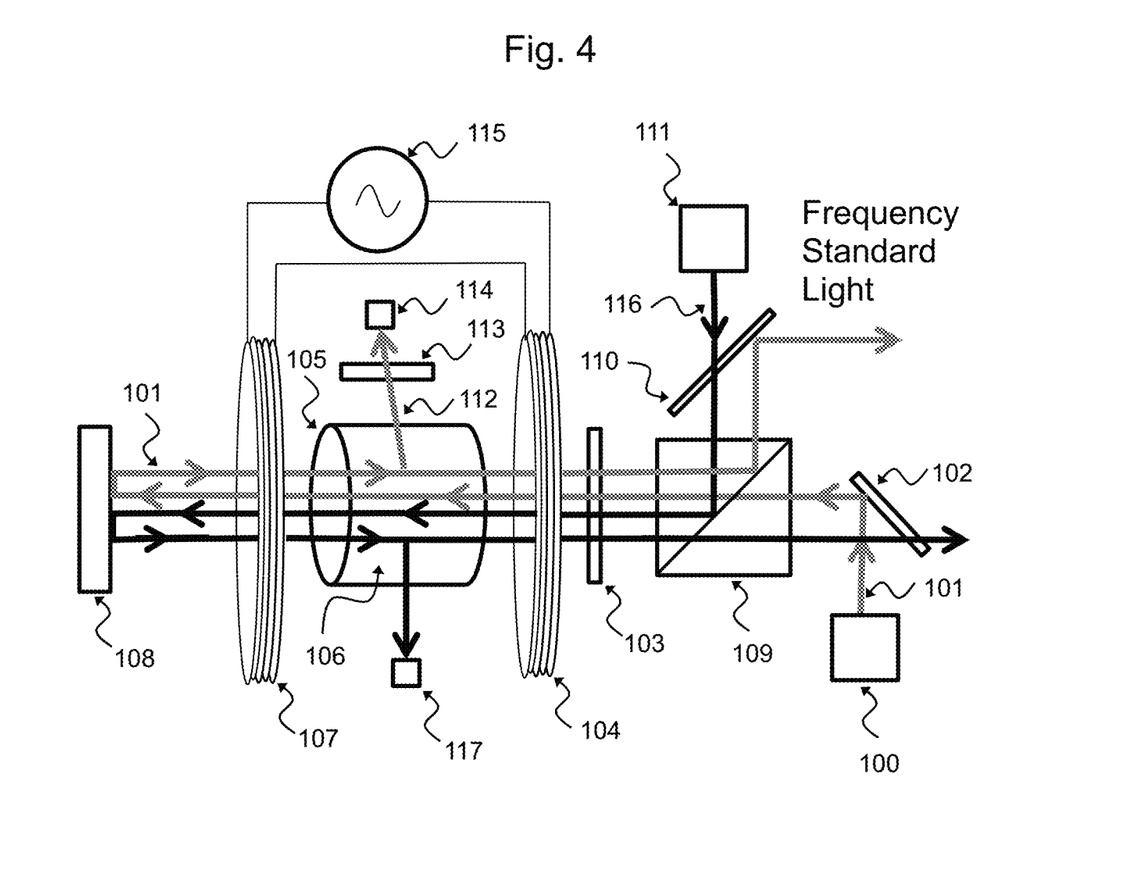
FIG. 4 is a schematic diagram of the major elements of a two-photon absorption frequency standard with optical pumping enhancement.

Next, the two-photon absorption light 101 may be transmitted through a quarter wave plate 103. The quarter wave plate 103 transforms the linear polarized two-photon absorption light 101 into circular polarization. It is assumed that circular polarized light is in actuality predominately circularly polarized. Next, the two-photon absorption light 101 may be transmitted through vapor cell 105. A magnetic field may be present inside vapor cell 105 supplied by magnets 104 and 107. The magnetic field induced inside vapor cell 105 may be produced by electromagnets such as Helmholtz coils. The two-photon absorption light 101 may propagate through absorbing substance 106 such as rubidium in the vapor state contained in vapor cell 105. The vapor cell 105 may have heating/cooling elements and a controller to maintain a specific temperature. Typically the temperature will be maintained at greater than room temperature but usually less than 120C. Next, the two-photon absorption light 101 may be incident upon a mirror 108 and may be reflected back upon itself. In FIG. 4 it is drawn showing the beams are separated to make clear the beam paths, but the two-photon absorption light 101 is reflected back upon itself by mirror 108.

Next, the two-photon absorption light 101 propagates back through vapor cell 105. Inside vapor cell 105 the two-photon absorption light 101 is coincident meaning travelling counter propagating upon the same path. Note that upon reflection off of mirror 108, the polarization state of two-photon pump light 101 is changed by π radians. Thus the polarization state changes from left circular polarization to right circular polarization or the polarization state changes from right circular polarization to left circular polarization. Note that the angular momentum vector of each of the photons comprising both forward and reverse beams all point in the same direction. Thus inside the vapor cell 105 the two-photon selection rules and transition energy are satisfied for the 5S to 5P to 5D two-photon transition of the rubidium vapor present inside vapor cell 105, with the photons absorbed travelling in opposite directions. Atom motion inside a vapor cell causes Doppler broadening of an absorption line. With two-photon absorption of opposing photons of equal wavelength, the Doppler broadening of the two-photon line is eliminated. Thus every atom in an energy transition allowed ground state is available for two-photon absorption regardless of its motion, and the two-photon absorption line becomes extremely narrow for use as a frequency standard. After propagating through vapor cell 105 the two-photon absorption light 101 travels back through quarter wave plate 103. After travelling through the quarter wave plate 103, the two-photon absorption light 101 is transformed from circular polarization back to linear polarization, however it's polarization is now orthogonal to the polarization of the two-photon absorption light 101 travelling opposite to it. Next, the two-photon absorption light 101 enters into the polarizing beam splitter 109 and instead of travelling through it, it is reflected inside it due to its polarization and exits a different path and is now separated from the two-photon absorption light 101 it was previously counter propagating with. Next, the two-photon absorption light 101 is incident upon mirror 110 which may be a dichroic mirror or a partially reflecting mirror. Two-photon absorption light 101 now is available for use as a frequency standard.

The atoms that absorb two photons and are in the final excited state will decay by more than one possible route back to the ground state. One possible route back to the ground state is with the emission of a photon of wavelength 420 nm. This emission may be used to generate feedback to lock the two-photon absorption light 101 to the two-photon absorption line. There will be other scattered light present besides the feedback light 112. A dichroic filter 113 may be used to pass feedback light 112 so that is incident upon a first detector 114, while blocking other light. A signal generator 115 my apply an oscillating current to the first electromagnet ring 104 and the second electromagnet ring 107 so there is an oscillating magnetic field permeating vapor cell 105. By the Zeeman Effect acting upon the absorbing substance 106 the two-photon absorption line is modulated up and down in frequency so that feedback can be generated to lock the two-photon absorption light 101 to the two-photon absorption line.

An optical pump light source 111 may be included that produces optical pump light 116. The optical pump light 116 may be in resonance with the absorbing substance 106. As an example, optical pumping light near wavelength 780 nm, in resonance with the rubidium $D_2$ line. The optical pump light 116 may be incident upon beam splitter 110 and after transmitting through it the optical pump light 116 travels coincident (along same beam path) with two-photon absorption light 101. Next, the optical pump light 116 is incident upon the polarizing beam splitter 109 where it may be reflected internally and next propagates to quarter wave plate 103 where the polarization state of the optical pump light 116 is transformed to predominately circular polarization. Next, the optical pump light 116 travels through vapor cell 105. Then, after reflecting off of mirror 108, the optical pump light 116 travels back through vapor cell 105. Inside the vapor cell 105 there is counter propagating optical pump light 116 and counter propagating two-photon absorption light 101 all of which are coincident. FIG. 4 shows them separated so that the beam paths are apparent, but in practice all the beams propagate along the same path within the vapor cell 105. Note that with the elements used here, the angular momentum vector of the pump light 116 is opposite to the angular momentum of the two-photon absorption light 101. An induced absorption line for light at 1475 nm is manifested by two-photon absorption in the rubidium. Note that 1475 nm is far away from 775.1 nm, does not influence the absorption line at 775.1 nm, and does not occur with any photons from the optical pump light 116 because it is out of energy resonance with two-photon absorption. The angular momentum of the optical pump light 116 is opposite to that of the two-photon pump light 101. Since the optical pumping light is in single-photon resonance with the absorbing substance 106, by optical pumping there is an increase in the number of atoms in a ground state that can accept two-photon absorption light 101 and a decrease in the number of atoms in a ground state that can accept optical pump light 116. After propagating through the vapor cell 105, the optical pump light 116 continues propagating and passes through the system as shown in FIG. 4. To lock the optical pump light upon resonance, the varying magnetic field induced by the first electromagnet 104 and second electromagnet 107 modulate the absorption line up and down in frequency, to generate feedback. Optical pumping light 116 may be absorbed by absorbing substance 106 and then emitted. Some of the emitted light may reach detector 117. Since two-photon absorption light 101 is not in single-photon resonance with absorbing substance 106, not much of it will reach detector 117. Detector 117 is used to monitor feedback for locking the optical pump light 116 to single-photon resonance.

Applying the above concepts we can begin to explain another embodiment of the current invention. The major elements of a two-photon absorption spectrometer with optical pumping enhancement are illustrated in schematic form in FIG. 5. In the figure, light beams are shown to be separated. This is to show the paths of the light. In actuality all the light paths are to be collinear within the vapor cell 207. A two-photon absorption light source 200 may be used to produce two-photon absorption light 201. An example of two-photon absorption light source 200 is a tunable DBR laser having a wavelength of approximately 780 nm. An optical pump light source 202 may be used to produce optical pump light 203. An example of optical pump light source 202 is a tunable DBR laser with a wavelength near 794 nm. The optical pump light 203 and the two-photon absorption pump light 201 may enter a polarizing beam splitter 204 so that the exiting beams are collinear. Then the collinear two-photon absorption pump light 201 and the optical pump light 203 may pass through a quarter wave plate 205. After exiting the quarter wave plate 205 the collinear optical pump light 203 and the two-photon absorption pump light 201 will be oppositely circularly polarized. Note that quarter waveplates are wavelength specific so when the wavelengths of the optical pump light 203 and the two-photon absorption pump light 201 differ substantially, then it is preferable to have the quarter wave plate 205 specified for the two-photon absorption light 201. In the case that the optical pump light 203 wavelength differs substantially from the quarter wave plate 205 wavelength specification, the polarization will be elliptical but mostly circular after exiting waveplate 205. Further note that when light is referred to as having circular polarization, it is understood the light is in actuality predominately circularly polarized. Next, the collinear two-photon absorption test light 201 and the optical pump light 203 are transmitted through a dichroic beam splitter 206 and then enter into vapor cell 207. Inside vapor cell 207 may be an absorbing substance 208 such as $^{85}$rubidium. A heater element and temperature controller may be implemented to control vapor temperature. Referring to FIG. 3, the optical pump light 203 may be in resonance with the $D_1b$ (upper ground state $D_1$ resonance) line of rubidium and the two-photon absorption light 201 may be in resonance with the $D_2a$ (lower ground state $D_2$ resonance) rubidium line. Since they are oppositely circularly polarized and in energy resonance with different ground states, the optical pump light 203 pumps rubidium atoms into states that are in resonance with the two-photon absorption light 201. The reverse also occurs.

Figure 5:
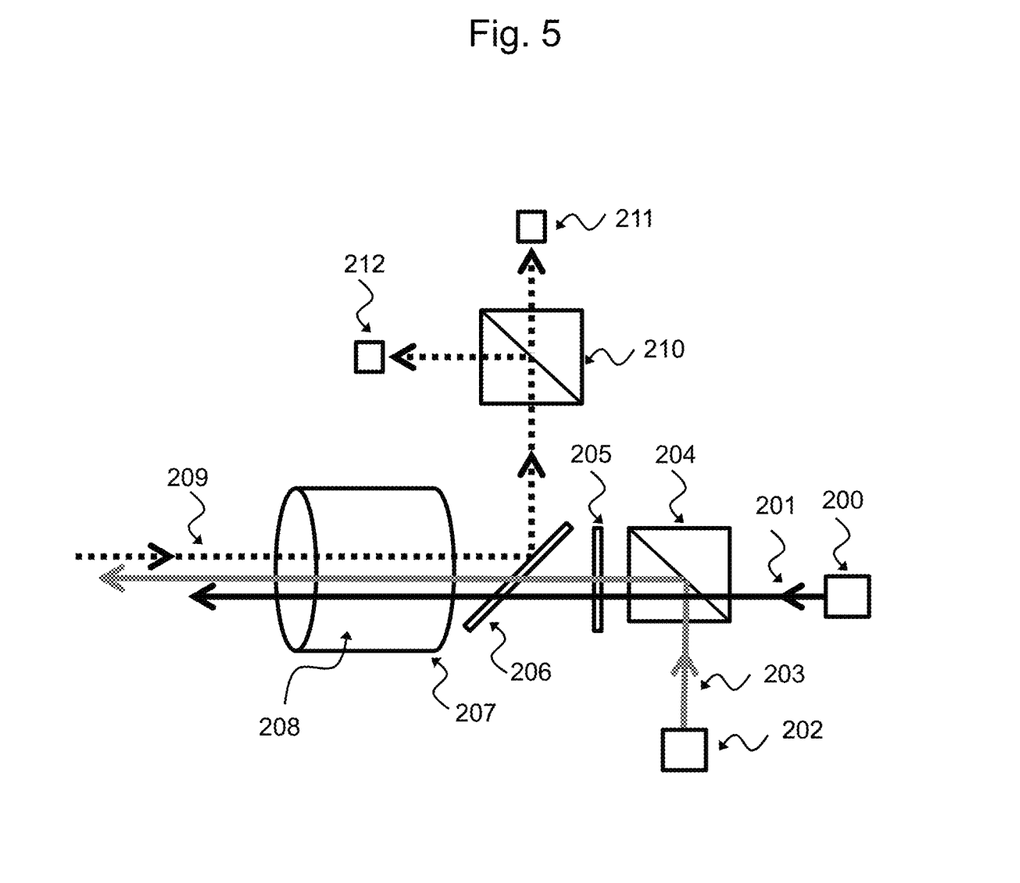
FIG. 5 is a schematic diagram of the major elements of a two-photon absorption optical spectrometer with optical pumping enhancement.
Figure 6A:
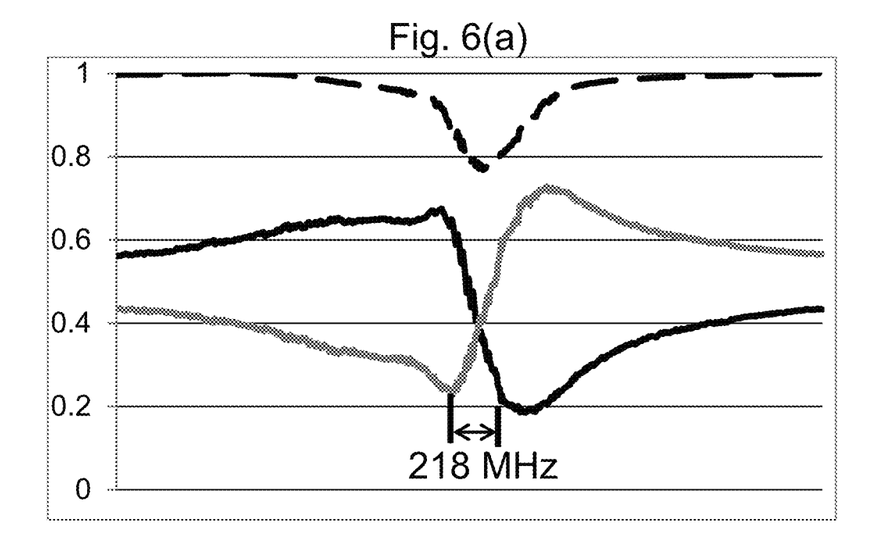
FIG. 6(a) is the experimental output of the two-photon absorption spectrometer with optical pumping enhancement.

The circularly polarized two-photon absorption 201 light induces an absorption line of the absorbing substance 208 which may be rubidium for probe light 209 near 1530 nm. The optical pump light 203 induces a two-photon absorption line in the rubidium for light at 1530 nm. Absorption does not occur with optical pump light 203 and probe light 209 because the energy doesn't coincide with a two-photon absorption line. If probe light 209 is linearly polarized, the induced absorption line will be for only one circular polarization component of the linearly polarized probe light 209. Probe light 209 may enter vapor cell 208 and be collinear with, but travelling opposite to, both the optical pump light 203 and the two-photon absorption light 201. While propagating through the vapor cell 207 the induced two-photon absorption line for one circular polarization component of the probe light 209 makes the medium circularly birefringent. The birefringence rotates the polarization state of the probe light 209 an amount that is dependent upon its frequency. Since there is absorption for one circularly polarized component of the linearly polarized probe light 209, it becomes elliptically polarized. The elliptically polarized probe light 209 can be expressed as a combination of linear polarized light and circular polarized light. When passing through a polarizing beam splitter, circularly polarized light is split evenly among paths. After travelling through vapor cell 207, the probe light 209 may be reflected off dichroic beam splitter 206 and enter polarizing beam splitter 210. An example of polarizing beam splitter 210 is a Wolloston prism. The polarizing beam splitter 210 may be oriented near 45 degrees relative the probe light 209 initial (before entering into vapor cell 207) polarization. The probe light 209 will split paths dependent upon its frequency. The split pathways of the probe light 209 may enter into a first detector 211 and a second detector 212. FIG. 6(a) shows an experimental normalized transmission spectrum as a function of frequency of probe light transmission into first detector 211 and second detector 212. Frequency can be determined from the relative magnitude of the two detectors: the difference of first detector 211 and second detector 212 divided by their sum. Another way frequency of the probe light can be deduced from the relative magnitude of light split into each pathway is: the output of first detector 211 divided by second detector 212. The apparatus disclosed here may also be used as a decoder of information that may be encoded into the frequency of the probe light 209. The experimental spectra is shown in FIG. 6(a) with the following attributes:

Vapor Cell 207 length: 5 cm
Vapor Cell 207 temperature: 85 C
Absorbing substance 208 inside vapor cell 205 is rubidium 85.

The optical pump light source 202 is a Photodigm DBR laser operating near 795 nm and power of 148 mW.

The two-photon absorption pump light source 200 is a Photodigm DBR laser operating near 780 nm with an output power of 170 mW.

The probe light is a Mitsubishi DFB laser with a wavelength near 1530 nm.

Figure 6B:
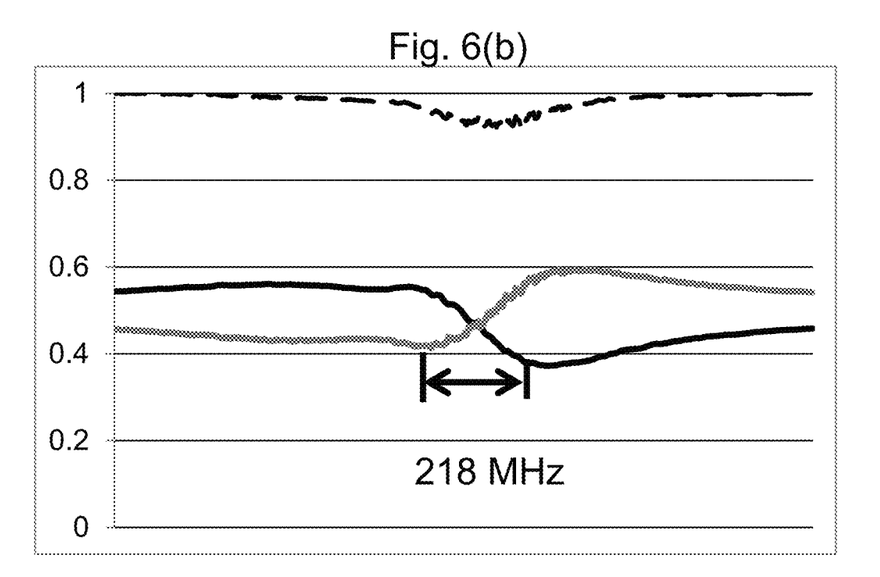
FIG. 6(b) is the experimental output of the two-photon absorption spectrometer without optical pumping enhancement.

In FIG. 6(b) all the attributes of the experiment are the same as listed above, except that pump light source 202 is blocked. This demonstrates the increase in two-photon absorption that can be attained by optical pumping enhancement.

What is claimed is:
1. An optical spectrometer acting upon probe light comprising:
   a) an absorbing substance;
   b) two-photon absorption light;
   c) optical pump light;
   wherein the two-photon absorption light is circularly polarized;
   wherein the optical pump light is circularly polarized opposite to the two-photon absorption light;
   wherein the optical pump light and the two-photon absorption light and the probe light are propagated through the absorbing substance;
   wherein the optical pump light pumps the absorbing substance into ground states where two-photon absorption with one photon from the two-photon absorption light and one photon from the probe light is allowed;
   wherein two-photon absorption is not allowed with the optical pump light;
   wherein the two-photon absorption light and the absorbing substance combine to create a birefringent medium for the probe light;
   wherein probe light frequency is determined from probe light polarization.

2. The optical spectrometer of claim 1 further comprising:
a magnet that produces a magnetic field that permeates the absorbing substance and shifts the frequency position of the two-photon resonance.

3. Two-photon absorption light having frequency located at an absolute frequency comprising:
  a) an absorbing substance;
  b) two-photon absorption light;
  c) optical pump light;
  wherein the two-photon absorption light is transmitted through the absorbing substance which absorbs the two-photon absorption light by the process of two-photon absorption when the frequency of the two-photon absorption light coincides with the frequency of the frequency locking point;
  wherein the optical pump light is transmitted through the absorbing substance and pumps the absorbing substance into a state where two-photon absorption of the two-photon light is allowed;
  wherein two-photon absorption is not allowed with optical pump light.

4. The two-photon absorption light having frequency located at an absolute frequency of claim 3 further comprising:
  a magnet that produces a magnetic field that permeates the absorbing substance;
  wherein the magnetic field is modulated and shifts the position of the absolute frequency to provide feedback to lock the two-photon absorption light to the absolute frequency.

* * * * *